United States Patent
Melnyk

(10) Patent No.: US 7,466,399 B2
(45) Date of Patent: Dec. 16, 2008

(54) FIBER OPTIC FLOW SENSING DEVICE AND METHOD

(75) Inventor: Ivan Melnyk, Coquitlam (CA)

(73) Assignee: Photon Control Inc., Burnaby, British Columbia (CA)

( * ) Notice: Subject to any disclaimer, the term of this patent is extended or adjusted under 35 U.S.C. 154(b) by 302 days.

(21) Appl. No.: 10/598,395

(22) PCT Filed: Feb. 25, 2005

(86) PCT No.: PCT/CA2005/000321

§ 371 (c)(1),
(2), (4) Date: Aug. 25, 2006

(87) PCT Pub. No.: WO2005/083369

PCT Pub. Date: Sep. 9, 2005

(65) Prior Publication Data

US 2008/0225264 A1    Sep. 18, 2008

(30) Foreign Application Priority Data

Feb. 26, 2004    (CA)    .................................... 2459091

(51) Int. Cl.
*G01P 3/36*    (2006.01)

(52) U.S. Cl. ........................................ 356/28.5; 356/28

(58) Field of Classification Search ............. 356/28, 356/28.5; 73/202.5, 204.11–204.14
See application file for complete search history.

(56) References Cited

U.S. PATENT DOCUMENTS

| | | | |
|---|---|---|---|
| 3,552,855 A * | 1/1971 | Crosswy et al. ............... 356/28 |
| 3,825,346 A * | 7/1974 | Rizzo ........................ 356/28.5 |
| 6,545,261 B1 | 4/2003 | Blake et al. | |
| 6,611,319 B2 | 8/2003 | Wang | |
| 6,653,651 B1 * | 11/2003 | Meinhart et al. ............ 250/573 |
| 7,030,970 B2 * | 4/2006 | Lin et al. ...................... 356/28 |
| 7,268,859 B2 * | 9/2007 | Sage et al. ................. 356/28.5 |

\* cited by examiner

*Primary Examiner*—Isam Alsomiri
(74) *Attorney, Agent, or Firm*—Kirton & McConkie; Evan R. Witt

(57) ABSTRACT

The invention provides an optical flow meter for measuring fluid flow through a pipe which obviates the need for the flow to be seeded with foreign particles. The meter comprises a fiber optic Sagnac interferometer with optical path crossing the flowing fluid. The interferometer measures velocity of the fluid by measuring the phase difference between the two beams propagating in the optical path in opposite directions. Light, which is deflected by the fluid, is collected by optical means at both sides of the optical path for calculation, the scintillating statistics and compensation for light intensity.

13 Claims, 9 Drawing Sheets

Flow

FIBER OPTIC FLOW SENSING DEVICE AND METHOD

TECHNICAL FIELD

The present invention relates to an optical flow meter for sensing the velocity of the fluid moving in a pipe. In particular, the invention relates to the use of a fiber optic Sagnac interferometer with an open optical path crossing the pipe to measure flow through the pipe.

BACKGROUND

Optical methods are suitable for sensing flow of fluids in pipes because they are non-invasive and offer high accuracy in a range of speed from millimeters per second up to several kilometers per second. However, traditional flow sensing devices such as laser Doppler velocimeters ("LDVs") require fluid flowing in a pipe to be seeded with foreign particles in order to maintain a proper signal-to-noise ratio. This feature limits the usefulness of LDVs because many industrial applications such as natural gas or steam pipelines, vent pipes, flare stacks, production of clean industrial gases and medical grade gases, etc. do not allow introduction of any particle contaminants.

Another type of optical velocimeter based on a method known as the "laser-two-focus" ("L2F") method uses particles naturally present in the flow for measurement of the time interval necessary for a particle to cross two sequential laser beams. Accuracy and turndown ratio (i.e., the ratio of the maximum to minimum flow rates which are measurable within a specified accuracy and repeatability) of the L2F method, however, is affected by the size and concentration of particles in the fluid. This limits practical application of the L2F method because the size and concentration of particles varies over time and at different measurement sites.

Neither LDV nor L2F velocimeters provide an average of the flow velocity across the pipe. This is a common drawback of single point measurement approaches, which could be improved only by adding extra measuring points. Multiple point measurement, however, requires complex optical systems, which increases the overall cost of sensing the flow.

U.S. Pat. No. 6,545,261 (Blake et al.) describes a fiber optic flow meter utilizing a Sagnac interferometer. Beams of light are passed through the flow in opposite directions parallel to the direction that the flow is moving. Due to the Fresnel drag effect, the light moving in the same direction as the flow travels faster than the light moving against the flow. By measuring the phase shift between paired beams traveling along the same path in opposite directions, it is possible to measure fluid velocity in the pipe, provided that the pair or beams are properly aligned. The accuracy increases proportionally with the length of the optical path along the pipe due to accumulation of the phase difference.

However, the longer the distance the light travels inside the pipe, the greater the beam misalignment. The misalignment reduces the signal-to-noise ratio and subsequently increases the measuring error. The beam misalignment is caused mainly by the refraction of the beam in the pipe; the beam oscillates due to turbulence in the flow and heat convection. Blake et al. also describes an alignment system for tracking the beam position at both sides of the pipe and keeping the beam stabilized with help of piezoelectric actuators. This method of velocity measurement requires complex and expensive hardware, including high-speed two-axis piezoelectric positioners. The frequency response of such elements is typically in the range of 10 kHz, which is lower than the frequency range of beam twinkling. Therefore, the alignment system is unable to compensate for rapid oscillation of the beam, and measuring error will be introduced by high frequency components generated by turbulence in the flow. In addition, piezoelectric actuators are subject to high hysteresis and have a limited range of operating temperatures. In particular, the piezoelectric effect is diminished below 0° C. The required temperature stabilization adds complexity and cost to the system because the temperature of the moving fluid can be highly variable (such as in flare stacks).

Cross-correlation methods for non-invasive measurement of fluid flow using optical means are known in the art. Optical methods usually are not adversely affected by high temperature because light sources and photodetectors can be located remotely from the hot measuring zones. U.S. Pat. No. 6,611,319 (Wang) describes an optical flow meter which is based on registration of the light twinkled (scintillated) due to the small changes of the refractive index with changes in temperature. The moving fluid is transilluminated by a single light source and the direct light is measured by two photodetectors spaced apart along the direction of flow. A cross-correlation function between signals from those photodetectors is calculated and a position of its maximum is determined. This position provides the average time which is necessary for the flow to move from one photodetector to the other. Consequently, the ratio of the distance between the photodetectors to the time delay gives an estimate of the average velocity of the flow. This method has low accuracy. The highest accuracy is about 1% according to the device specifications. A need for larger diameter pipe is another drawback of this method. The flow meter can be used for pipes not smaller than one meter in diameter. These factors limit practical application of the twinkling method.

There is the need for a robust, reliable, simple and inexpensive optical flow meter which will provide an accurate measurement of flow rate in pipe of various diameters.

SUMMARY OF INVENTION

It is an object of the present invention to provide an optical flow sensing device which will be accurate over a large range of flow rates.

It is another object of the present invention to provide such an optical flow sensing device which does not require the flow to be seeded with foreign particles.

It is further an object of the present invention to provide such an optical flow sensing device which is not dependent on the size and concentration of particles in the flow.

It is yet another object of the present invention to provide such an optical flow sensing device which is robust, reliable, simple and inexpensive.

According to a preferred embodiment of the present invention, an optical flow sensing device comprises a fiber optic Sagnac interferometer with an open optical path crossing a moving fluid obliquely to the flow direction. Paired counter-propagating beams traveling through the open path are affected differently by the flow. The phase velocity of the beam, which travels along the flow, is accelerated proportionally to the flow velocity component projected on the open optical path, while the phase velocity of the counter-propagating beam traveling against the flow is decelerated at the same level. The phase difference accumulated along the open optical path may be measured by a Sagnac interferometer with a high accuracy, typically better than a fraction of microradian. The phase difference increases with the open optical path length; therefore, a more oblique orientation of the open optical path along the pipe will increase the measuring accuracy.

Additional collecting optical systems with a number of receiving apertures are preferably disposed around the ends of the fibers which create an open optical path. The collecting optical systems collect light which is distorted by the moving fluid and which misses the fibers of the Sagnac interferometer after traveling along the open path. Some of receiving apertures are preferably positioned along the flow direction so that the fluctuations in the light received by such receiving apertures are highly correlated with a time delay proportional to the flow velocity and spacing between the apertures.

Light from collecting optical systems is preferably processed in a cross-correlation and compensation unit, which is connected to a digital signal processor of the Sagnac interferometer. The unit estimates the flow velocity based on cross-correlation analysis of the scintillating light received by receiving apertures positioned along the flow direction. The estimated value of the flow velocity is used for final calculation of the flow velocity, in particular, when the Sagnac interferometer is misbalanced due to the shock, vibration or high fluid turbulence.

The cross-correlation and compensation unit preferably also measures the amount of light which misses the fibers of the Sagnac interferometer due to scattering as it crosses the open optical path, and the position of the laser spot at the apertures of the fibers. The unit sends a compensation signal to the laser driver of the Sagnac interferometer, which increases the laser power when the amount of light missing the fibers increases, thus keeping the level of signals in a phase demodulation circuit at a constant level. The compensation procedure can be done much faster than by piezoelectric beam tracking in that no moving parts are required and the frequency response of the modulation techniques employed in preferred embodiments of the invention exceeds the gigahertz level.

The amount of light passing through the fluid and position of the light spot also provides information about refractive index of the fluid, which may change due to the pressure variation. This data is preferably also sent to the digital signal processor of the Sagnac interferometer for compensation due to changes in the refractive index because the phase difference is proportional to the square of the refractive index.

Preferred embodiment of the present invention, therefore, allow the high accuracy offered by the Sagnac interferometer to be maintained in harsh industrial environments associated with temperature variation, pipe vibration, sudden injection of fluids from pressurized vessels, etc. The beam compensation technique employed in preferred embodiments of the invention is fast and it does not require complex tracking systems.

The present invention, as well as its numerous advantages, will be better understood by the following nonrestrictive description of possible embodiments made in reference to the appended drawings.

BRIEF DESCRIPTION OF DRAWINGS

In drawings which illustrate non-limiting embodiments of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Figure 1:
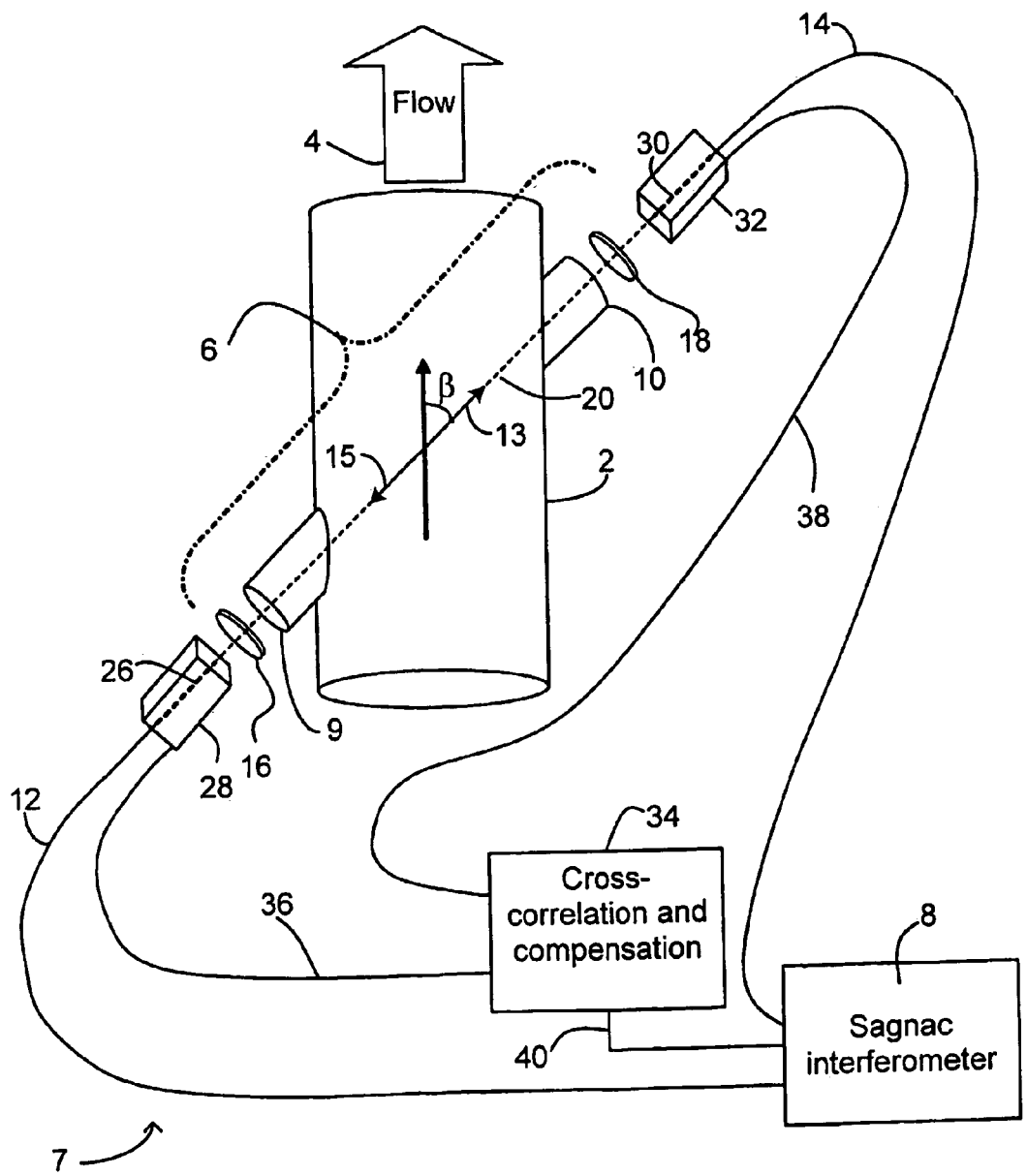
FIG. 1 schematically illustrates an optical flow meter according to a preferred embodiment of the invention.

FIG. 1 schematically illustrates a preferred embodiment of the invention. A pipe 2 with a fluid flow 4 passing therethrough is located in an open portion 6 of a loop 7 of a Sagnac interferometer 8. Pipe 2 has a pair of optical windows 9 and 10 which isolate fluid flow 4 from the environment and allow light from Sagnac interferometer 8 to pass therethrough. Sagnac interferometer 8 directs a beam through each of fibers 12 and 14, such that the beams travel in opposite directions through loop 7. The beams preferably comprise light with a wavelength in the range of 600 to 1600 nanometers. Within this range, shorter wavelengths are generally preferred as they will produce larger phase shifts than longer wavelengths in the same situation, as one can see from Equation (1) below. The beam from fiber 12 returns to Sagnac interferometer 8 by means of fiber 14, and vice versa. The beams are collimated by focusing elements 16 and 18, such that the beams are directed in opposite directions through fluid flow 4 along an open optical path 20 at an angle $\beta$ to the flow direction. This arrangement results in a pair of counter-propagating beams 13 and 15 passing through the fluid along path 20: beam 13 travels from fiber 12 to fiber 14 and beam 15 travels from fiber 14 to fiber 12. Fibers 12 and 14 preferably serve as means for directing the pair of beams 13 and 15 in opposite directions along a path through the flow of fluid, as well as means for receiving beams 13 and 15.

As flow 4 passes through open path 20, it interacts with the counter-propagating beams 13 and 15 from Sagnac interferometer 8 due to the Fresnel drag effect. The moving fluid "drags" the light traveling through it and the speed of the beams of light are shifted depending on the direction of light relative to the fluid velocity, such that the counter-propagating beams 13 and 15 are oppositely affected. The higher the refractive index of the fluid, the stronger the effect. The difference in the speeds of beams 13 and 15 as they travel along path 20 of loop 7 results in the phases of beams 13 and 15 being shifted in opposite directions. Sagnac interferometer 8 detects the phase difference between the beams of light.

Figure 2:
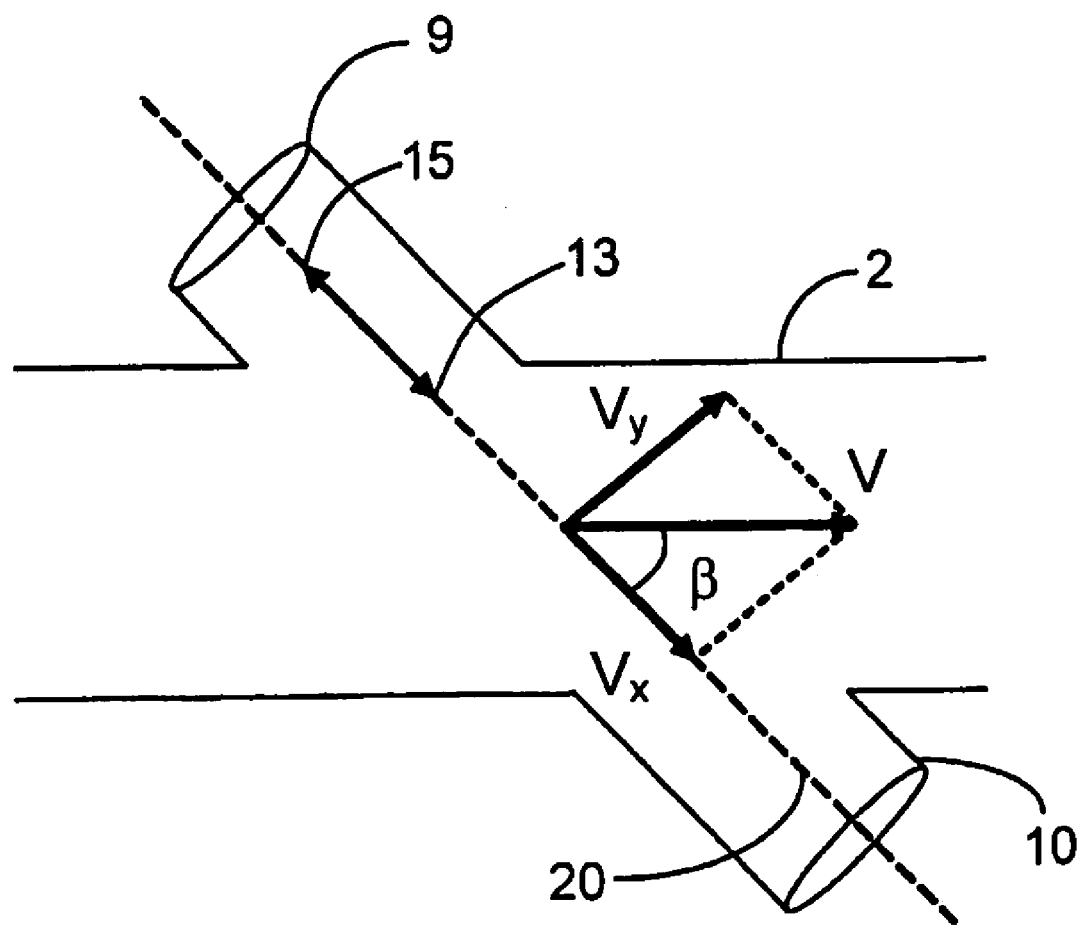
FIG. 2 is a vector diagram illustrating two beams of light passing through the pipe of FIG. 1.

FIG. 2 is a vector diagram illustrating beams 13 and 15 passing through pipe 2 at angle β to a velocity V of flow 4. Velocity V comprises a component $V_x$=V cos β which is parallel to path 20 and another component $V_y$=V sin β which is perpendicular to path 20. Beam 13 is accelerated by a factor $\alpha V_x$ as it passes through flow 4 while beam 15 is decelerated by the same amount. α is known as the drag coefficient and depends on the refractive index n and dispersion dn/dλ of the fluid, as well as the free space wavelength of the light. The phase difference accumulated by the counter-propagating beams is:

$$\Delta\phi = (4\pi/\lambda c)n^2\alpha L k V_x \quad (1)$$

where λ is the free space wavelength; c is the speed of light in vacuum; L is the length of the optical path inside the moving fluid; and k is a scale factor which depends on the beam diameter and the pipe diameter and takes into account a non-uniform flow distribution across pipe 2. The scale factor k takes into account velocity changes along the optical path L and across the cross section S of the pipe, and can be calculated as a normalized value:

$$k = \frac{\frac{1}{S}\int\int_S V(r)dS}{\frac{1}{L}\int\int_L V(r)dL} \quad (2)$$

where V(r) is a function which describes the velocity distribution or "flow profile" across the pipe.

The velocity profile can be symmetrical and described by a parabolic function (laminar flow) or by a high-order power function (turbulent flow). The velocity profile is asymmetrical in the presence of pipe bending and branching.

The final flow rate F is calculated as a product of the cross-sectional area of the pipe $A_s$ and the average velocity $V_{av}=V_x/\cos\beta$, which is determined from the phase difference Δϕ and corrected by the scale factor k:

$$F = A_s V_{av} \quad (3)$$

The phase difference Δϕ proportionally increases with the length L that beams 13 and 15 travel in the fluid. The dynamic range of Sagnac interferometer 8 is defined as a ratio $\Delta\phi/\Delta\phi_{min}$, where $\Delta\phi_{min}$ is the minimum phase difference determined from the desirable signal-to-noise ratio. Consequently, the dynamic range of Sagnac interferometer increases with L.

The proposed flow sensing device could be built using existing Sagnac interferometers designed for fiber optic gyroscopes ("gyro(s)"). The technology is well developed, robust and readily available. Fiber optic gyros offer high accuracy over a wide range of phase shifts. It is known (Blake J, et al. "Sagnac-interferometer-based Fresnel flow probe", Appl. Opt. V.37, 1998, pp. 6690-6694), for example, that commercial fiber optic gyros made by Honeywell™ Inc. have minimum phase resolution of 0.1 microradian, or $\Delta\phi_{min}=10^{-7}$ rad. At atmospheric pressure, the refractive index of air is n=1.00035. According to data presented by G. Sanders, et al. ("Measurement of Fresnel drag in moving media using a ring-resonator technique", J. Opt. Soc. Am, B, v.5, No. 3, 1988, pp. 674-678), this will provide the Fresnel drag coefficient α=0.0007 if the optical dispersion of the air is neglected. Assigning k=1, and choosing L=1 m, λ=0.85 μm equation (1) above gives the accumulated phase $\Delta\phi=30.8\times10^{-6}$ rad for the unit velocity, $V_x$=1 m/s. Thus, when a Honeywell gyro is modified for use in the embodiment of FIG. 1, the minimum detectable velocity for this example is $V_{min}=1/\Delta\phi/\Delta\phi_{min}$=0.003 m/s, which is smaller by a factor of 30 than any known gas flow meter can offer. Maximum velocity in industrial pipelines ranges from 30 m/s to 50 m/s. This gives the dynamic range or turndown ratio of the optical flow meter of at least 10,000:1. This value is not achievable by any other flow metering technique. The refractive index of the natural gas in commercial gas pipelines operating at a pressure of 100 bar is much higher (n~1.04), which leads to higher accuracy in velocity measurements made by the embodiment of FIG. 1. Optical flow meters based on Sagnac interferometers according to preferred embodiments of the present invention provide increased dynamic range and turndown ratios over known flow meters.

The optical fibers used in Sagnac interferometers are usually single mode fibers with core diameters ranging from eight to nine microns. The core could be even smaller if the light source used in the interferometer emits visible light. The small size of the cores makes it difficult to accurately focus light from one fiber into the fiber at the other end of open optical path 20. As each beam of light 13 and 15 travels between fibers 12 and 14 over the distance L, it diverges due to the limited aperture and optical aberrations of focusing elements 16 and 18. In addition, flow 4 absorbs, disperses and scatters the propagating light. These factors cause the substantial beam expansion and reduction of the light intensity incident on fibers 12 and 14. In the present invention, this problem is solved by providing a compensation signal, which is representative of the total light intensity received by fibers 12 and 14, to a control system for the light source, which varies the level of light output such that the total light intensity received by fibers 12 and 14 remains constant, as described below. The compensation signal may also include differential signals proportional to the amounts of displacement of the center of light spots generated by the beams from the center of the fibers upon which they are incident. The differential signals are used to correct for changes in the phase difference Δϕ caused by changes in the refractive index of the flowing fluid, as described further below with reference to FIG. 5B.

Returning to FIG. 1, fibers 12 and 14 terminate in fiber tips 26 and 30, respectively. Fiber tips 26 and 30 are surrounded by collecting optical systems 28 and 32, respectively. Collecting optical systems 28 and 32 are coupled to a cross-correlation and compensation unit 34 by means of optical fibers 36 and 38, respectively. Cross-correlation and compensation unit 34 is coupled to Sagnac interferometer 8 by means of connection 40.

Figure 3A:
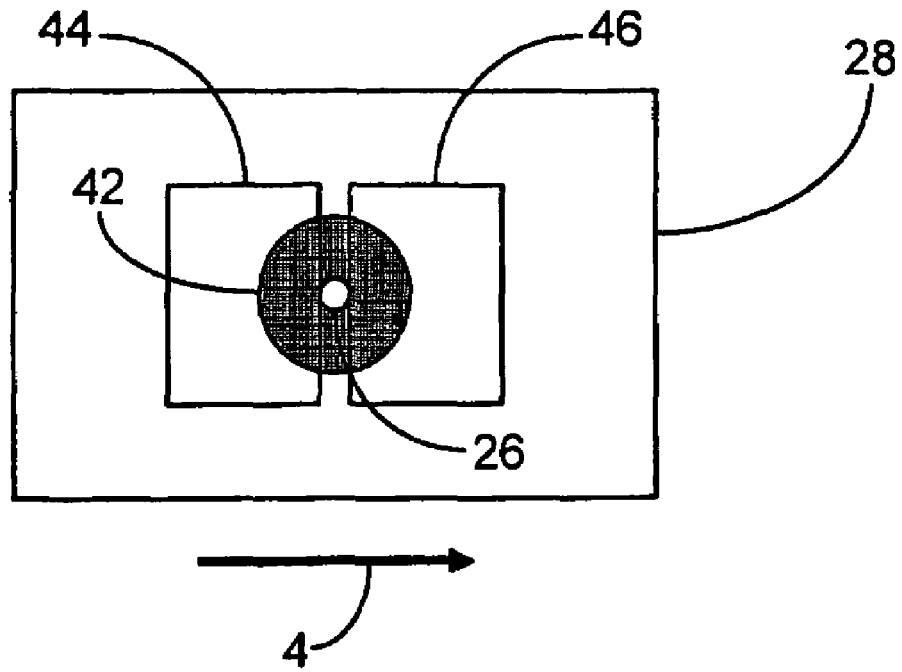
FIG. 3A is an end view of receiving apertures of one of the collecting optical systems of FIG. 1 and the associated fiber tip, showing a light spot incident on the collecting optical system and fiber tip.
Figure 3B:
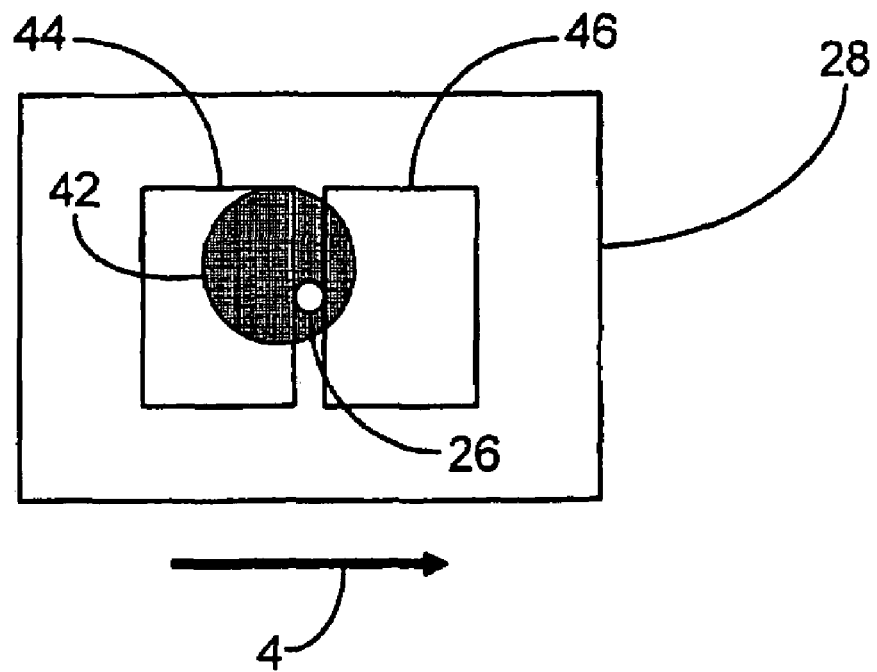
FIG. 3B is the same view as FIG. 3A wherein the center of the light spot has been shifted due to beam deflection by the fluid.

FIG. 3A is an end view of fiber tip 26 and collecting optical system 28 of fiber 12, and illustrates the comparative size of a light spot 42 generated by beam 15 incident on fiber tip 26. A similar arrangement is provided at fiber tip 30 of fiber 14. In the example illustrated in FIG. 3A, light spot 42 has been properly aligned with fiber 12 so as to be centered on fiber tip 26 in order to maximize the intensity of the light measured by Sagnac interferometer 8. Collecting optical system 28 includes receiving apertures 44 and 46 disposed around fiber tip 26. Two apertures are shown but it is to be understood that a different number of apertures may be used without departing from the spirit and scope of the invention. Preferably, receiving apertures 44 and 46 are oriented along the direction of flow.4. As shown in FIG. 3B, light spot 42 may by shifted due to deflection and may not be properly aligned with fiber 12.

Figure 4:
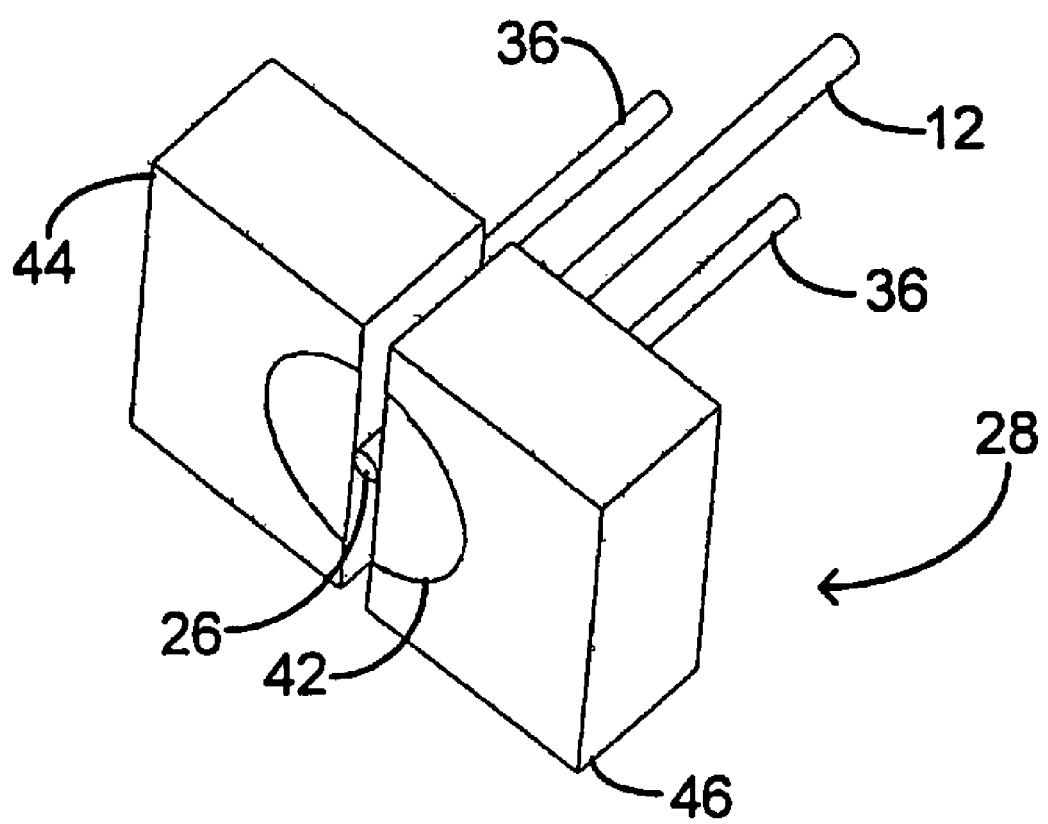
FIG. 4 is an isometric view of the receiving apertures of FIG. 3A.

Receiving apertures 44 and 46 are coupled to fibers 36, as shown in FIG. 4. Returning briefly to FIG. 1, fibers 36 serve to provide light received by receiving apertures 44 and 46 of collecting optical system 28 to cross-correlation and compensation unit 34. Likewise, fibers 38 serve to provide light received by the receiving apertures (not shown) of collecting optical system 32 to cross-correlation and compensation unit 34.

Figure 5A:
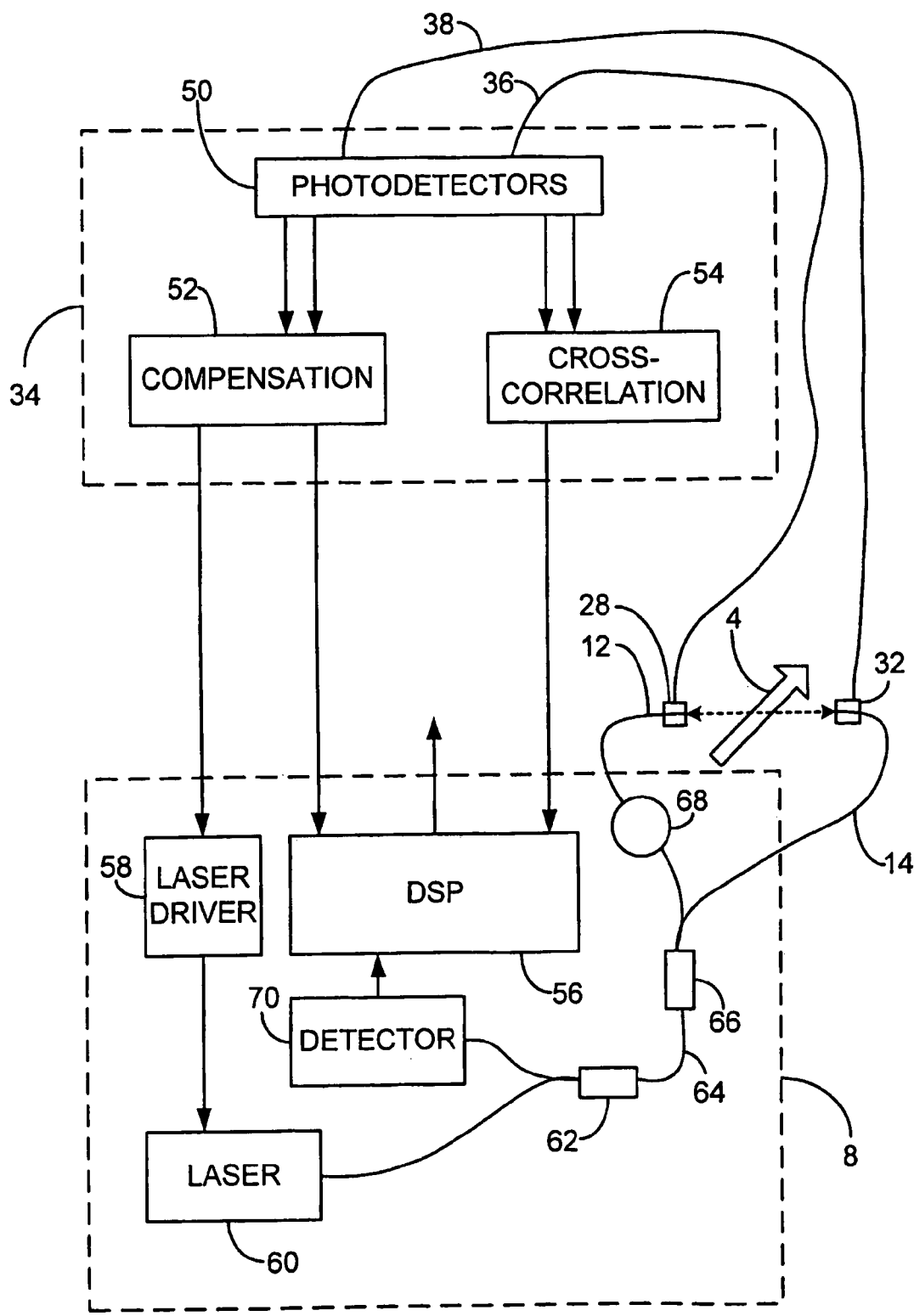
FIG. 5A is a schematic illustration of the cross-correlation and compensation unit and the electrical circuit of the Sagnac interferometer of FIG. 1.

FIG. 5A schematically illustrates the interaction between cross-correlation and compensation unit 34 and Sagnac interferometer 8. Cross-correlation and compensation unit 34 receives light from collecting optical systems 28 and 32 and converts it into proportional electrical signals via a photodetecting module 50. Photodetecting module 50 preferably comprises a plurality of photodetectors which are coupled to collecting optical systems 28 and 32 by means of optical fibers 36 and 38. Signals from photodetecting module 50 are provided to a compensation module 52 and a cross-correlation module 54. Compensation module 52 generates a compensation signal representative of an estimated total intensity of the light that reaches fibers 12 and 14 after crossing open path 20 by taking a summation of the intensities of the signals received from the receiving apertures of collecting optical systems 28 and 32. Compensation module 52 provides the compensation signal to a laser driver 58, which controls a laser 60. Laser driver 58 provides electrical current to laser 60 at a level which is changed proportionally to the level of the compensation signal such that the light total intensity incident on fibers 12 and 14 is kept constant. Such compensation can be done very fast. Conventional photodetectors and laser drivers, developed for optical communication, can modulate light with frequencies exceeding 10 GHz, which exceeds the turbulence frequency by many times.

Figure 5B:
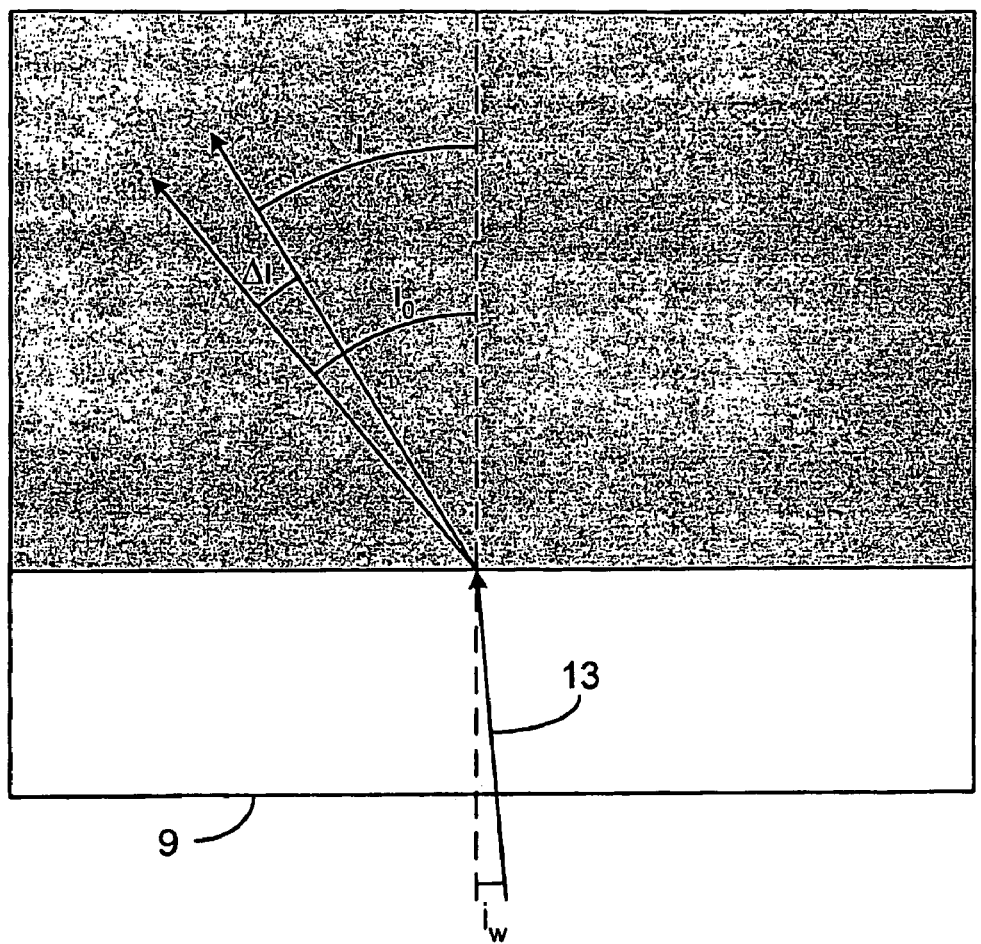
FIG. 5B is a schematic illustration of deflection of a beam of light due to changes in the refractive index of the fluid.

Compensation module 52 preferably also calculates differential signals representative of the level of displacement of light 42 spot from the center of fiber 12 or 14 by measuring the difference between the intensities received by the receiving apertures of the associated collecting optical system 28 or 32. Compensation module 52 provides the differential signals to a Digital Signal Processor (DSP) 56, in order to compensate for changes in the refractive index of the flow. As shown in FIG. 5B, although beam 13 is generally perpendicular to window 9 as it passes therethrough, there may be a small angle of incidence $i_w$ of beam 13 relative to the perpendicular. According to Snell's law, beam 13 will be refracted in the pipe at angle $i_0$ which is defined from the equation:

$$n_w \sin(i_w) = n_0 \sin(i_0) \quad (4)$$

where $n_w$ and $n_0$ are the refractive indices of the window and the fluid, respectively. However, the refractive index of the fluid may change over time. When no changes by an amount $\Delta n$, the refraction angle changes to $i = i_0 + \Delta i$ according to:

$$n_w \sin(i_w) = (n_0 + \Delta n) \sin(i_0 + \Delta i) \quad (5)$$

The deflection of beam 13 by an angle $\Delta i$ introduces a lateral shift of beam 13 which is proportional to the differential signal for that beam. Thus, DSP 56 can use the differential signal to calculate changes in the refractive index n of the fluid, allowing for greater accuracy in the calculation of the phase difference in equation (1) above and the velocity V of the flow, as described below.

Returning to FIG. 5A, within Sagnac interferometer 8 light from laser 60 passes through a coupler 62 associated with a main fiber optic cable 64. A second coupler 66, which is located at the opposite end of cable 64, splits the light into two beams delivered through fibers 12 and 14 to fluid flow 4. One of the fibers is coupled to a modulator 68, which modulates the phase of the light. The two counter-propagating beams return back to the main cable 64 via coupler 66 and are directed by coupler 62 to a photodetector 70, which converts the light into an electrical signal proportional to the phase difference $\Delta\phi$. The signal from photodetector 70 provided to DSP 56, which provides demodulation, filtration, integration and other operations necessary for determining the final velocity of the flow, $V = \Delta\phi \lambda c / (4\pi n^2 \, \alpha L k \cos\beta)$. One such operation may include a correction for fluid concentration, which is defined from the optical density based on light attenuation in the pipe provided by compensation module 52. Concentration of the gaseous media is proportional to its density and, subsequently, to its refractive index n which is associated with the phase difference according to equation (1) above.

Cross-correlation module 54 determines the elapsed time τ at which a cross-correlation function between signals from two receiving apertures separated by an effective distance d along the direction of the flow, reaches the maximum value. The elapsed time is directly related to the velocity as $V_r = d/\tau$. Although the value $V_r$ may be less accurate than the velocity V as determined by Sagnac interferometer 8, it is desirable to provide $V_r$ to DSP 56 for use in solving ambiguity problems associated with phase unwrapping procedures. Phase unwrapping is used for determining the total accumulated phase difference. For a given measured phase difference $\Delta\phi_m$ the total accumulated phase difference $\Delta\phi$ may be $\Delta\phi_m$, $\Delta\phi_m + 2\pi$, $\Delta\phi_m + 4\pi$, ... etc. Thus, calculation of V from equation (1) above yields a number of possible actual velocities, and DSP 56 may select the V which is closest to $V_r$.

Value $V_r$ may be used in combination with V determined by the interferometer if a very short design of the flow meter (i.e. angle β approaches the perpendicular) is desirable. In a short flow meter, light propagates the fluid at almost 90 degrees to the flow. This reduces the value of the $V_x$ component and subsequently the phase difference $\Delta\phi$ recorded by the interferometer, making the calculation of V susceptible to inaccuracies. In such a case, $V_r$ may be used instead of V.

The estimated velocity $V_r$ may also be used as a final result of the measurement if the flow is disturbed by the turbulence to such a degree that the light spot 42 is shifted beyond the tip 26 or 30 of fiber 12 or 14, further than shown in FIG. 3B. If either light spot 42 completely misses tip 26 or 30, photodetector 70 does not detect any interference pattern and no phase difference can be recorded. Highly disturbed flow occurs for instance in industrial environments when valves in pressurized vessels are opened or in the presence of multiple phases in the flow. Interference can be destroyed if the pipe is exposed to shock or vibration. The cross-correlation method, therefore, improves the reliability of the Sagnac method, which, as with most interferometric methods, is sensitive to vibrations.

As will be understood by a person skilled in the art, the compensation and cross-correlation modules 52 and 54 may be incorporated into DSP 56. Other useful functions and features may be included into the schematic presented in FIG. 5A, which will enhance the performance of the device. For example, a fiber polarizer can be connected to the main cable for improving the modulation depth. This and other improvements, however, do not change the main function of the device.

Figure 6A:
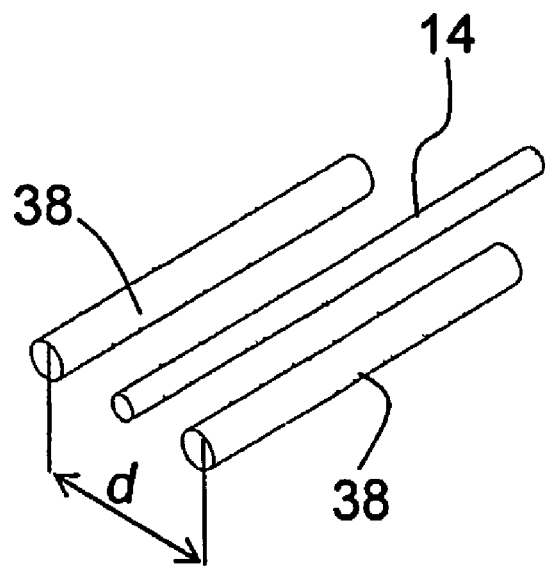
FIG. 6A illustrates receiving apertures comprising two optical fibers positioned on either side of the central single mode fiber of the Sagnac interferometer, according to one embodiment of the invention.
Figure 6B:
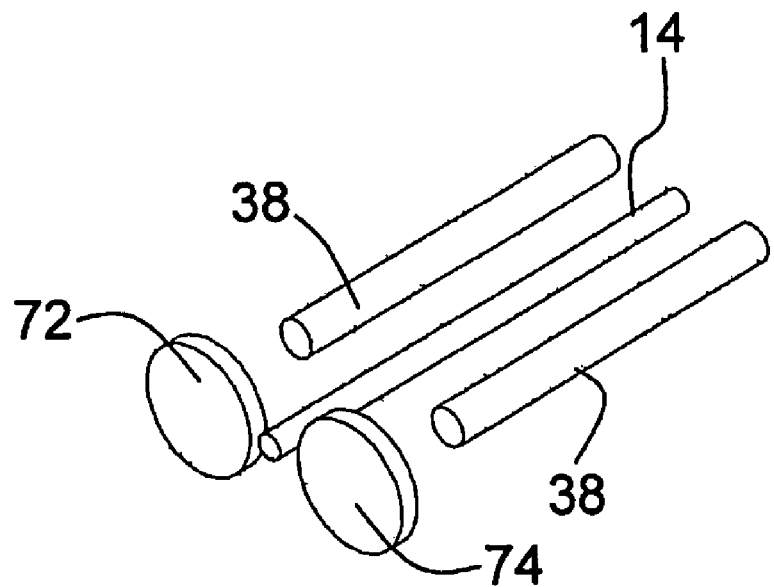
FIG. 6B illustrates the receiving apertures of FIG. 6A with collecting microlenses.

The receiving apertures of collecting optical systems 28 and 32 can be built in a variety of ways. FIG. 6A, for example, illustrates the simplest embodiment, with two receiving fibers 38 equally disposed from a central single-mode fiber 14. Receiving fibers are preferably multimode fibers so that they can collect more light due to the larger diameter. Additional optical focusing elements, such as microlenses 72 and 74 shown in FIG. 6B, may be used to increase the collecting efficiency. Microlenses 72 and 74 can be made as GRIN lenses which are compact and more efficient for coupling with fibers.

Figure 7:
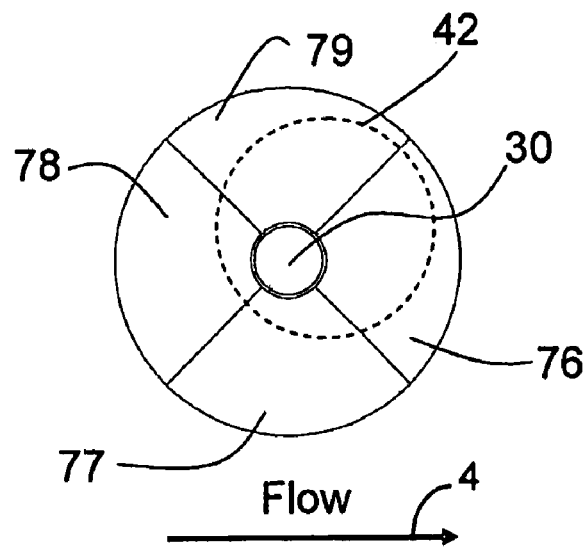
FIG. 7 illustrates receiving apertures comprising a bifurcated fiber optic system with peripheral fiber bundles serving as the receiving apertures, according to another embodiment of the invention.

FIG. 7 illustrates another embodiment of receiving apertures of collecting system 28 or 32, which employs a bifurcated design. Fiber tip 26 or 30 is surrounded by multiple fibers assembled in a number of fiber optics bundles 76 through 79. In the example shown in FIG. 7, fiber optic bundles 76 and 78 are used by cross-correlation module 54 for determining the velocity $V_r$, while signals from pairs of bundles 76, 78 and 77, 79 are used by compensation module 52 for calculating the differential signals representative of the position of the center of the light spot 42.

Figure 8:
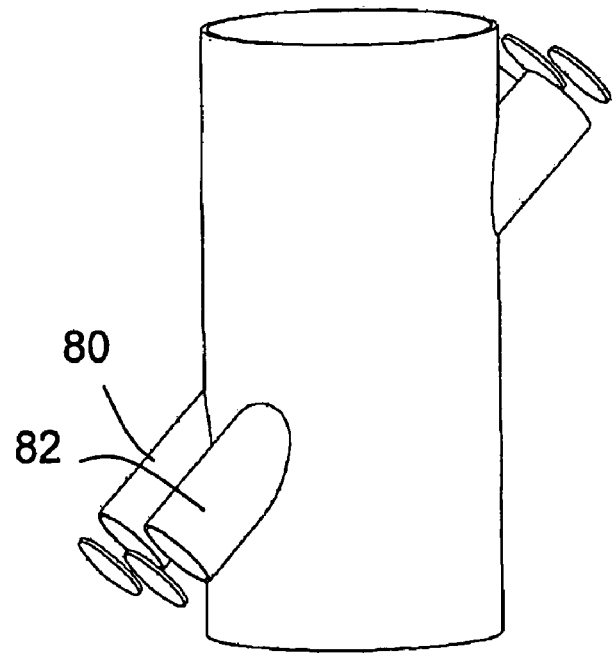
FIG. 8 illustrates a multi-path optical flow meter having two parallel open optical paths, according to another embodiment of the invention; and, FIG. 9 illustrates an optical flow meter adapted to measure flow through a U-shaped pipe, according to another embodiment of the invention.

According to another embodiment of the present invention, the accuracy of the device can be improved by using multiple channels or multiple interferometers. An example of a two-channel arrangement is shown in FIG. 8. Preferably, two channels 80 and 82 are parallel, although non-parallel and non-symmetrical location of the beam across the pipe can be used.

Figure 9:
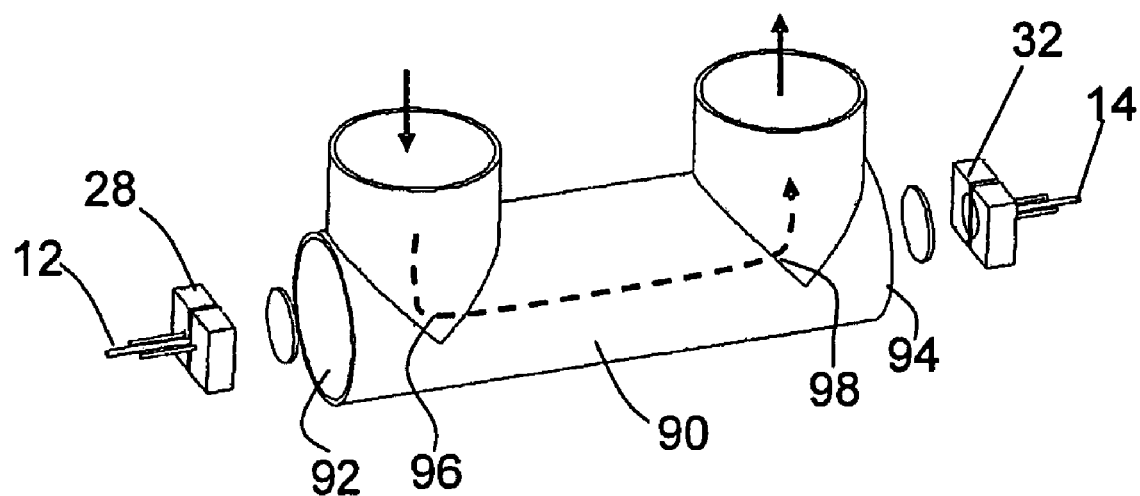

The highest sensitivity of the Sagnac interferometer based flow meter is achieved along the flow direction, when β=0. The axial arrangement of the flow meter requires a U-shape piping with optical windows disposed in elbows. An example of such an arrangement is shown in FIG. 9. A U-shaped pipe 90 has two windows 92 and 94 disposed against each other at the straight run of the pipe. Fibers 12 and 14 and collecting optical systems 28 and 32 are located to collect the deflected and scattered light as described above. Cross-correlation and compensation unit 34 records the estimated velocity in elbow areas 96 and 98 where flow changes the direction and beam scintillations are correlated with the velocity.

The optical flow meter described above is accurate and it does not require particle seeding which will contaminate the fluid. The presented device can be built based on conventional fiber optic interferometers without using complex piezoelectric tracking systems for laser beam stabilization. The beam oscillating effect, which usually limits the performance of the Sagnac interferometers, can be used for improving the accuracy of the optical flow meter by tracking the light intensity and calculating the estimated value of the velocity $V_r$ using the cross-correlation method.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. An optical flow meter for measuring a flow of fluid through a pipe, the optical flow meter comprising:
   (a) a wave energy source for generating a pair of beams;
   (b) a driver for controlling the wave energy source;
   (c) a modulator coupled to said wave energy source for modulating a phase of one of said pair of beams at a phase modulation frequency;
   (d) means for directing said pair of beams in opposite directions along a path through the flow of fluid;
   (e) means for receiving a pair of diffused beams after said pair of beams have crossed said path;
   (f) a detector for detecting said pair of diffused beams and for producing an electrical signal representative of a phase difference between said pair of diffused beams;
   (g) a digital signal processor configured to receive said electrical signal and calculate a flow velocity from said phase difference between said pair of diffused beams;
   (h) a pair of collecting optical systems positioned at opposite ends of said path adjacent to said means for directing said pair of beams for collecting deflected wave energy from said pair of beams; and
   (i) a compensation module coupled to receive said deflected wave energy from said collecting optical systems, said compensation module configured to estimate a total intensity of wave energy received by said means for receiving said pair of diffused beams and to generate a compensation signal representative of said total intensity of wave energy received, and coupled to provide said compensation signal to said driver, whereby said driver controls said wave energy source to vary an initial intensity of said pair of beams in response to said compensation signal such that said total intensity of wave energy received remains constant.

2. An optical flow meter according to claim 1 wherein said means for directing said pair of beams in opposite directions along a path through the flow of fluid and said means for receiving said pair of diffused beams after said pair of beams have crossed said path comprise a pair of fibers, each of said pair of fibers comprising a tip positioned to direct one of said pair of beams towards a tip of the other of said pair of fibers.

3. An optical flow meter according to claim 2 wherein said wave energy source is configured to produce a second pair of beams, and wherein said pair of fibers comprises a first pair of fibers and said path comprises a first path, further comprising:
   (a) a second pair of fibers for directing said second pair of beams in opposite directions along a second path through the flow of fluid, each of said second pair of fibers comprising a tip positioned to direct one of said second pair of beams towards a tip of the other of said second pair of fibers and to receive a diffused beam from the tip of the other of said second pair of fibers; and,
   (b) a second pair of collecting optical systems, each of said second pair of collecting optical systems positioned adjacent to the tip of one of said second pair of fibers for collecting deflected wave energy from said second pair of beams.

4. An optical flow meter according to claim 3 wherein said first and second paths are generally parallel.

5. An optical flow meter according to claim 1 wherein at least one of said collecting optical systems comprises a pair of receiving apertures separated by a distance along a direction of said flow of fluid, the optical flow meter further comprising a cross-correlation module coupled to receive signals from said pair of receiving apertures, said cross-correlation module configured to generate an estimated flow velocity based on a cross-correlation function of said signals from said pair of receiving apertures and provide said estimate flow velocity to said digital signal processor.

6. An optical flow meter according to claim 1 wherein said compensation module is configured to provide said compensation signal to said digital signal processor, and wherein said digital signal processor is configured to calculate a refractive index of said flow from said compensation signal and use said refractive index in calculation of said flow velocity.

7. An optical flow meter according to claim 1 wherein said path through the flow of fluid is at an acute angle to a direction of the flow of fluid.

8. An optical flow meter according to claim 1 wherein said path through the flow of fluid is parallel to a direction of the flow of fluid.

9. An optical flow meter according to claim 1 further comprising a polarizer coupled to said wave energy source for polarizing said pair of beams.

10. An optical flow meter according to claim 1 wherein said wave energy source comprises a laser.

11. An optical flow meter for measuring a flow of fluid through a pipe, the optical flow meter comprising:
  (a) a Sagnac interferometer comprising a laser for generating a pair of beams, a driver for controlling said laser, a modulator coupled to said laser for modulating a phase of one of said pair of beams at a phase modulation frequency, a detector for receiving said pair of beams and for producing an electrical signal which oscillates with said phase modulation frequency, and a digital signal processor configured to receive said electrical signal and calculate a flow velocity from a phase difference between said pair of beams;
  (b) a pair of fibers coupled to the Sagnac interferometer to receive said pair of beams from said laser and return said pair of beams to said detector, said pair of fibers positioned to direct said pair of beams in opposite directions along a path through the flow of fluid at an acute angle to a direction of the flow, each of said pair of fibers comprising a tip positioned to direct one of said pair of beams towards a tip of the other of said pair of fibers and to receive a diffused beam from the tip of the other of said pair of fibers;
  (c) a pair of collecting optical systems, each of said pair of collecting optical systems positioned adjacent to the tip of one of said pair of fibers for collecting deflected light from said pair of beams; and,
  (d) a compensation module coupled to receive said deflected light from said collecting optical systems, said compensation module configured to estimate a total intensity of light received by the tips of said pair of fibers and generate a compensation signal representative of said total intensity of light received by the tips of said pair of fibers, and coupled to provide said compensation signal to said driver,
  whereby said driver controls said laser to vary an initial intensity of said pair of beams in response to said compensation signal such that said total intensity of light received by the tips of said pair of fibers remain constant.

12. A method of measuring a flow of fluid through a pipe, the method comprising:
  (a) generating a pair of beams of wave energy with a wave energy source;
  (b) modulating one of said pair of beams at a phase modulation frequency;
  (c) directing said pair of beams in opposite directions along an open optical path through the flow of fluid at an acute angle to a direction of the flow of fluid by means of a pair of fibers coupled to the wave energy source;
  (d) receiving said pair of beams after said pair of beams have passed through the flow of fluid by means of said pair of fibers;
  (e) producing an electrical signal representative of a phase difference between said pair of beams received in step (d) by means of a detector coupled to said pair of fibers;
  (f) calculating a flow velocity from said phase difference between said pair of beams;
  (g) collecting deflected wave energy from said pair of beams by means of a pair of collecting optical systems positioned at opposite ends of said open optical path;
  (h) calculating a total intensity of said pair of beams received in step (d) based on the deflected wave energy collected in step (g) and providing said total intensity to a driver of said wave energy source; and,
  (i) controlling said wave energy source with said driver to vary an initial intensity of said pair of beams in response to said total intensity such that said total intensity remains constant.

13. A method of measuring a flow of fluid through a pipe, the method comprising:
  (a) calculating a flow velocity of said flow of fluid by means of a Sagnac interferometer comprising a laser controlled by a driver for generating a pair of beams, a pair of fibers coupled to said laser for directing said pair of beams in opposite directions along an open optical path through the flow of fluid at an acute angle to a direction of the flow of fluid and for receiving said pair of beams, and, a detector for measuring a phase difference between said pair of beams received by said pair of fibers;
  (b) collecting deflected light from said pair of beams by means of a pair of collecting optical systems positioned at opposite ends of said open optical path;
  (c) calculating a total intensity of said pair of beams received in step (a) based on the deflected light collected in step (a) and providing said total intensity to said driver of said laser; and,
  (d) controlling said laser with said driver to vary an initial intensity of said pair of beams in response to said total intensity such that said total intensity remains constant.

* * * * *